United States Patent [19]

Mourlevat et al.

[11] Patent Number: 5,169,592
[45] Date of Patent: Dec. 8, 1992

[54] METHOD OF PROTECTING A NUCLEAR REACTOR IN THE EVENT OF A LOAD INCREASE

[75] Inventors: Jean-Lucien Mourlevat, Noisy Le Roi; Olivier Pavageau, Suresnes, both of France; Pierre Kockerols, Wilrijk, Belgium

[73] Assignee: Framatome, Courbevoie, France

[21] Appl. No.: 731,330

[22] Filed: Jul. 17, 1991

[30] Foreign Application Priority Data

Jul. 17, 1990 [FR] France ............................ 90 09094

[51] Int. Cl.$^5$ .............................................. G21C 9/00
[52] U.S. Cl. ................................. 376/215; 376/247; 376/241
[58] Field of Search ............... 376/277, 297, 241, 215, 376/216, 217, 244; 976/DIG. 300, DIG. 302

[56] References Cited

U.S. PATENT DOCUMENTS

| | | |
|---|---|---|
| 3,979,255 | 9/1976 | Bulgier .............................. 376/215 |
| 4,337,118 | 6/1982 | Sakurai et al. ..................... 376/216 |
| 4,647,421 | 3/1987 | Ohashi et al. ...................... 376/216 |
| 4,654,186 | 3/1987 | Leroy et al. ....................... 376/216 |
| 4,710,341 | 12/1987 | Bernard et al. ..................... 376/216 |
| 4,738,818 | 4/1988 | Cantineau .......................... 376/216 |
| 4,748,814 | 7/1988 | Tanji et al. ........................ 376/216 |
| 4,975,238 | 12/1990 | Regan et al. ....................... 376/216 |

FOREIGN PATENT DOCUMENTS 0277594 8/1988 European Pat. Off. .
2040522 8/1980 United Kingdom .

Primary Examiner—Brooks H. Hunt
Assistant Examiner—Frederick H. Voss
Attorney, Agent, or Firm—Pollock, Vande Sande & Priddy

[57] ABSTRACT

An emergency stop of a pressurized water reactor to be protected is triggered when the nuclear power (ET) thereof reaches an emergency stop limit (LP). The value of this limit is lower with lower operating temperatures (ST) of the reactor.

7 Claims, 5 Drawing Sheets

METHOD OF PROTECTING A NUCLEAR REACTOR IN THE EVENT OF A LOAD INCREASE

FIELD OF THE INVENTION

The present invention relates to controlling nuclear reactors, and more particularly pressurized water nuclear boilers, in such a way as to cause them to provide at all times the power required to satisfy varying needs. Simultaneously, such control is performed in such a manner as to avoid as far as possible both unnecessary burning of fuel and any risk of an accident. In particular, very stringent safety criteria are defined for limiting such risks with respect to the boilers constituted by such reactors.

BACKGROUND OF THE INVENTION

Such a boiler comprises components that are well known and are referred to below in the description of the present invention. In particular, such a boiler is provided with a protection system which is triggered by excess reactor power, and with a protection system which is triggered by too high a temperature in the cooling fluid. These systems are referred to below as the "excess power system" and the "high temperature system". They are designed to protect the reactor core during certain accidental transients during which they trigger an emergency stop of the reactor. To this end, they generate an emergency stop signal on the basis of measurements of the following parameters:

(a) the temperature difference DT between the hot branch and the cold branch, which difference is representative of the nuclear power, i.e., the heat power of the reactor;

(b) the mean temperature ST of the reactor vessel;

(c) the primary pressure (used only by the high temperature system);

(d) the speed of rotation VP of the primary pumps; (representative of the flow rate of the primary heat exchange fluid); and (e) the axial power difference DI, i.e., the difference between the power measured at the top of the core and the power measured at the bottom of the core.

By way of example, the nuclear power limit beyond which one or the other of these two protection systems generates an emergency stop signal is shown in FIG. 3. In FIG. 3, curves JP and KP represent the limit, and apply respectively to constant values of pump speed and to constant values of axial power difference.

A problem arises in the operation of this system. The problem can be described with the help of FIG. 3 where a curve ET shows the typical behavior of an accidental transient due to uncontrolled increase in the load on the secondary heat exchange circuit. This circuit is thermally coupled to the steam generator which constitutes a heat receiver in the primary heat exchange circuit. Two phenomena arise:

(a) the increase in load on the secondary circuit causes more power to be extracted from the primary circuit, thereby reducing the operating temperature ST of the reactor; and (b) the reactor control system increases the nuclear power in order to keep up with the increased demand from the secondary circuit.

An analysis of this type of transient has shown that with a protection system of known design, an emergency stop of the reactor is not guaranteed. With some transients, the safety criteria that guarantee fuel integrity are not satisfied.

SUMMARY OF THE INVENTION

A particular object of the present invention is to improve reactor protection by limiting the consequences that may arise from an accidental transient due to uncontrolled increase in the load on the secondary heat exchange circuit of a pressurized water nuclear power station and in the event that such a transient causes an increase in nuclear power.

To this end, the invention proposes a correction on the excess power system emergency stop limit as a function of temperature.

The present invention thus provides a protection method for a nuclear reactor, in particular a pressurized water reactor, in the event of an increase in its load, whereby an emergency stop of the reactor is triggered in the event that its nuclear power reaches an emergency stop limit, said limit being lowered for lower operating temperatures of the reactor.

BRIEF DESCRIPTION OF THE DRAWINGS

An embodiment of the present invention is described below with reference to the accompanying drawings, it being understood that the items and dispositions described and shown are given purely by way of example.

FIGS. 3 and 5 also show an emergency stop limit KP that results from the action of the conventional high temperature system used simultaneously with the excess power systems of FIGS. 2 or 4.

DESCRIPTION OF PREFERRED EMBODIMENT

Figure 1:
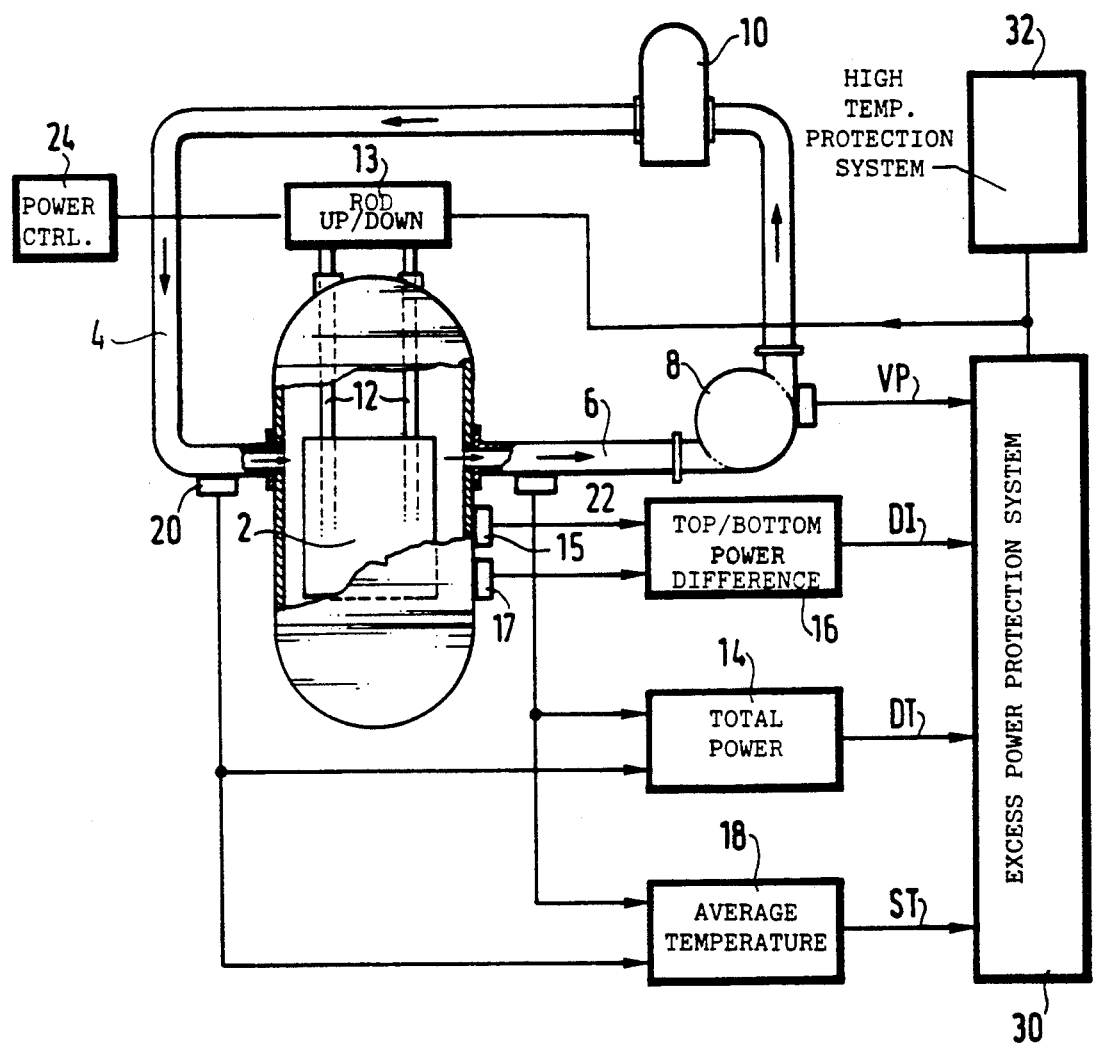
FIG. 1 is a schematic diagram of a reactor to which the present invention applies.

In general terms, the present invention applies to a reactor comprising the following known components, as shown in FIG. 1:

(1) a core 2 containing fuel rods in which a nuclear reaction takes place, giving off nuclear power which is spread between a top and a bottom of said core and which is transformed into heat.

(2) a heat exchange circuit for causing a heat exchange fluid to penetrate into the core via an inlet duct 4 and to flow through the core under drive from a primary pump 8, leaving the core via an outlet duct 6 so as to remove said heat therefrom. This circuit delivers the heat to a heat receiver 10 having varying needs and conventionally constituted by a steam generator 10 which transfer the power to a secondary circuit. The pump 8 is provided with a speed sensor which provides a pump speed signal VP.

(3) clusters of control rods 12 driven by mechanisms 13 for penetrating on command into the core from the top thereof in order to control the nuclear reaction therein.

(4) a power measuring system 14 for delivering a total power signal DT representative of the nuclear power. This system takes the difference between the temperatures measured by two temperature detectors 20 and 22 placed on the inlet and outlet ducts 4 and 6, respectively.

(5) a power difference measuring system 16 for providing a power difference signal DI representative of an axial difference in the nuclear power between the top and the bottom of the core. This system receives signals from two neutron detectors 15 and 17 respectively placed facing the top and the bottom of the core 2.

(6) a temperature measurement system 18 for providing an operating temperature signal representative of an operating temperature which is a temperature of said heat exchange or cooling fluid. This system takes the average of the temperatures measured by the detectors 20 and 22.

In conventional manner, the control system for the reactor comprises:

a power control system 24 acting on some of the control clusters 12 as a function, in particular, of variations in the needs of the heat receiver 10, so as to ensure that the heat receiver receives heat power that corresponds, at least approximately, to its needs; and an excess power protection system 30 suitable for providing an emergency stop signal causing at least some of said control clusters to penetrate into the core so as to stop said nuclear reaction quickly. To this end, this system receives at least the total power signal DT and the operating temperature signal ST. It provides an emergency stop signal AR to the mechanism 13 when the nuclear power represented by said total power signal DT exceeds an emergency stop limit LP which is defined on the basis at least of the temperature signal ST.

The excess power protection system 30 and a high temperature protection system 32 both receive all of the signals mentioned above, with the high temperature protection system also receiving a primary pressure signal.

According to the present invention, the emergency stop limit LP is lowered for values of the temperature signal ST which correspond to operating temperatures T that are less than a reference temperature TR.

This emergency stop limit preferably obeys a positive slope law as a function of operating temperature ST, and this law is preferably linear.

Also preferably, the reference temperature TR lies between 270° C. and 320° C., and preferably between 290° C. and 300° C. when the method is applied to a pressurized water reactor.

Also preferably, when the operating temperature ST is 20° C. less than the reference temperature TR, the value of the emergency stop limit LP is less than one-half the value that it has when said operating temperature is a little higher than said reference temperature.

Figure 2:
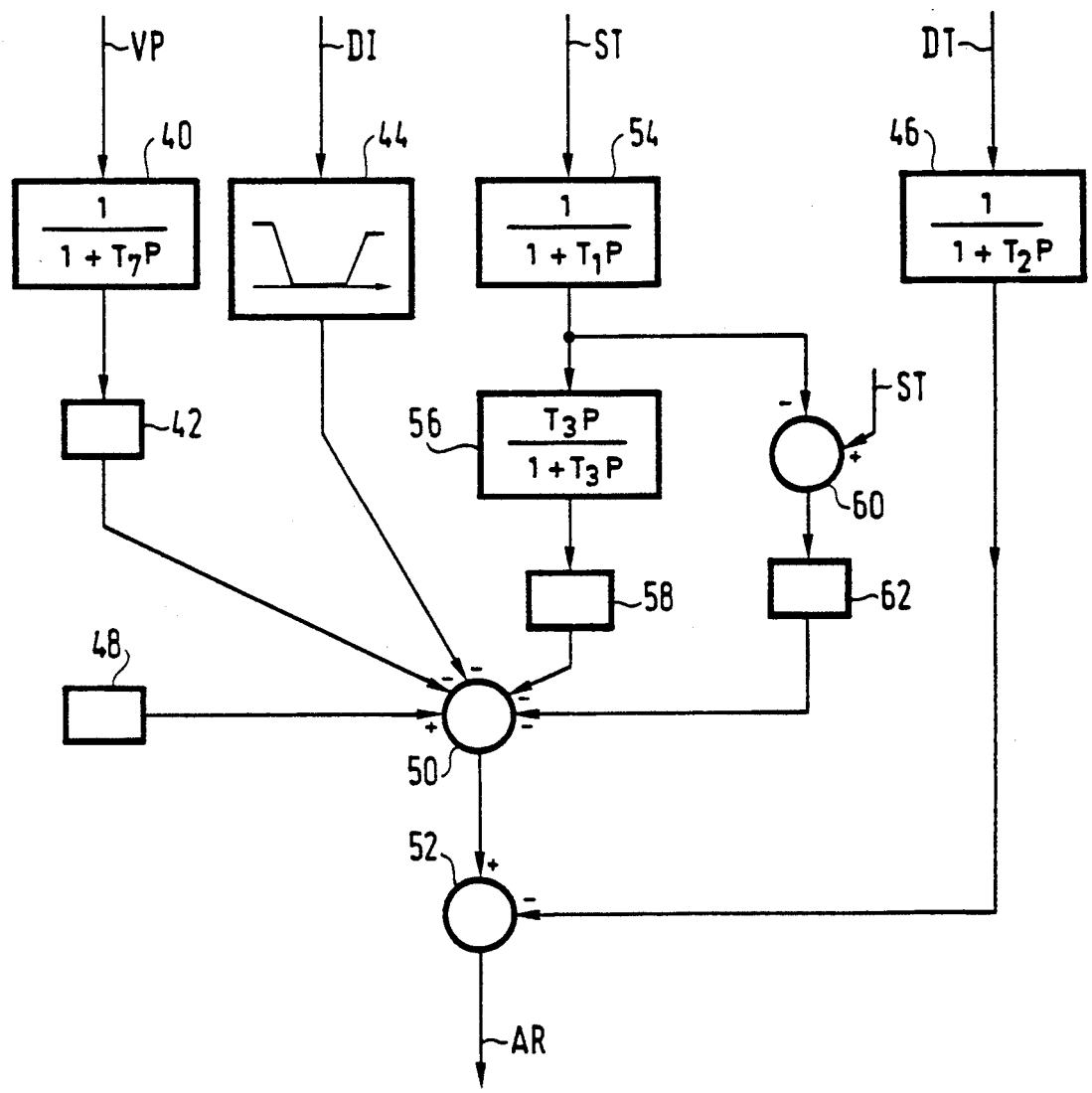
FIG. 2 is a flow chart applicable to a known excess power system for protecting the reactor.

As shown in FIG. 2, a known protection system suitable for constituting the protection system 30 comprises:

a filter circuit 40 and a multiplier 42 for processing the pump speed signal VP;

a circuit 44 for processing the axial power difference signal DI;

a filter circuit 46 for processing the nuclear power signal DT; and a circuit 48 for providing an additional, constant signal to summing circuits 50 and 52 which provide the emergency stop signal AR.

The temperature signal ST representative of the operating temperature of the reactor passes via a filter circuit 54.

Figure 3:
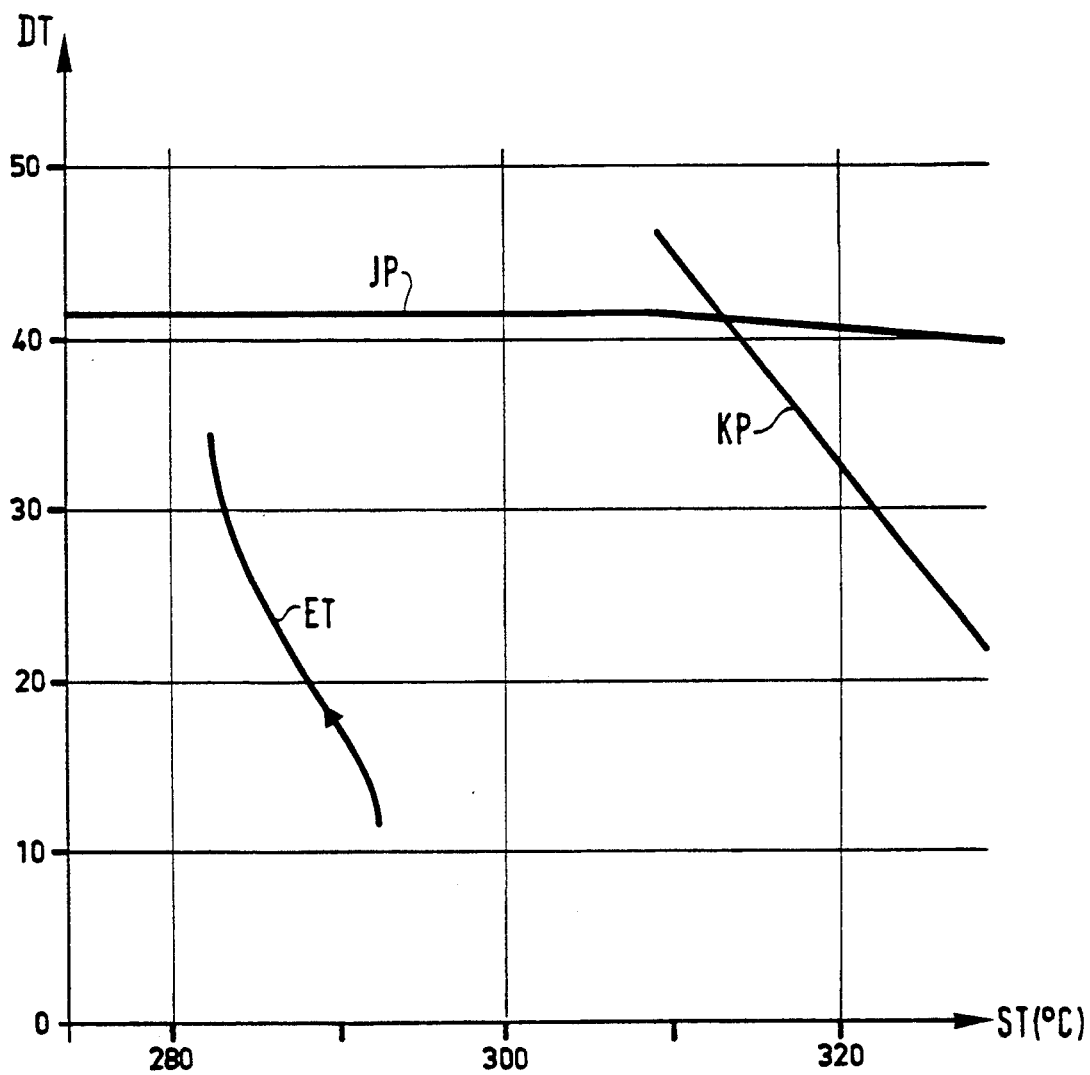
FIG. 3 is a graph showing variations in the emergency stop limit JP relating to nuclear power plotted up the Y axis as a function of operating temperature plotted along the X axis when the system of FIG. 2 is in use.

It is then applied to the summing circuit 50 via two paths. A first path includes a filter circuit 56 and a multiplier 58. A second path includes firstly a summing circuit 60 which also receives a signal PN representative of a nominal temperature. Thereafter it includes a multiplier 62. The emergency stop limit JP obtained in this way is shown in FIG. 3.

Figure 4:
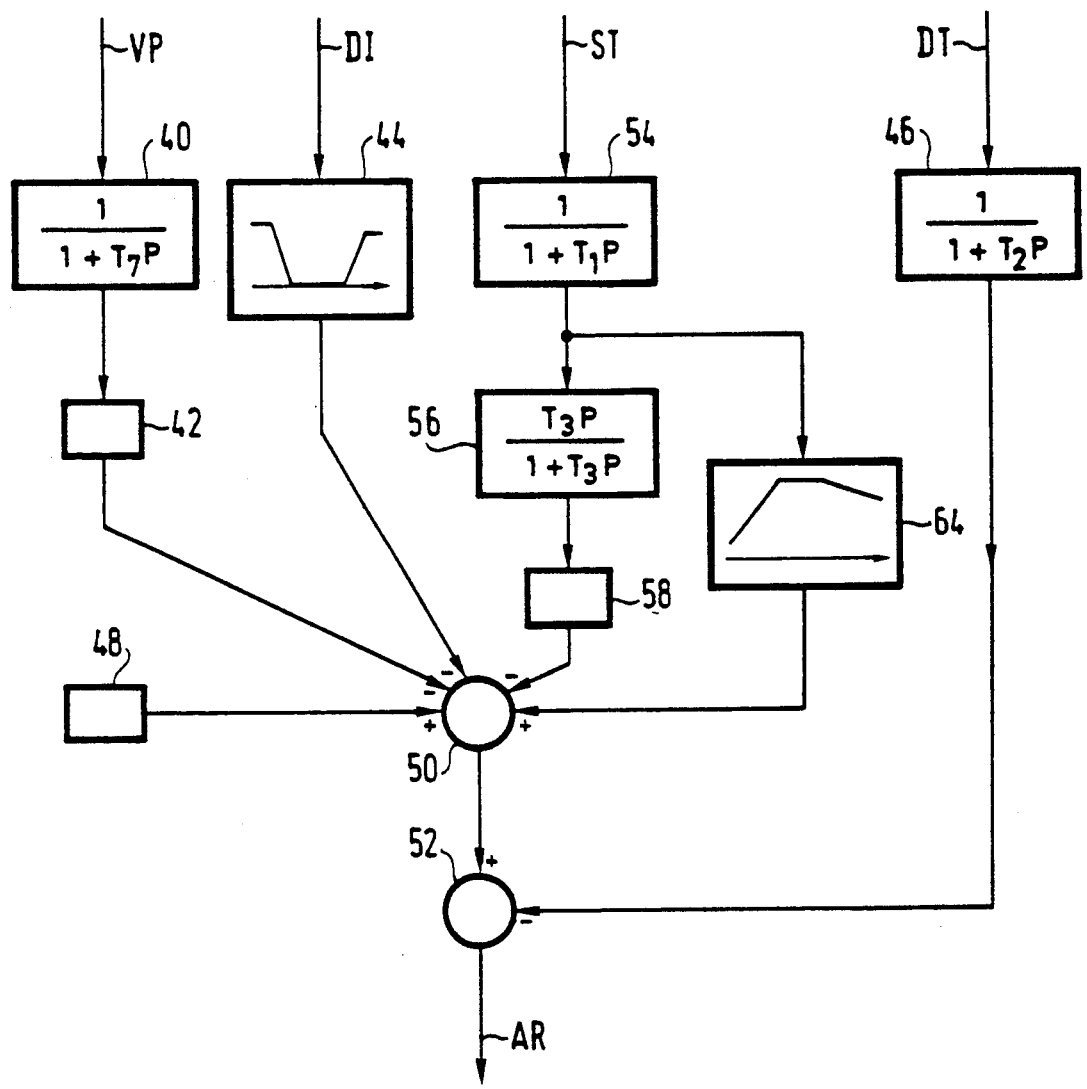
FIG. 4 is a flow chart of an excess power system of the invention, applicable to the reactor of FIG. 1.

The excess power protection system of the present invention for constituting the system 30 is identical to that shown in FIG. 2 except with respect to the second abovementioned path, as can be seen in FIG. 4. This second path is now constituted by a function generator 64 which causes the emergency stop limit LP to vary, as shown in FIG. 5.

Figure 5:
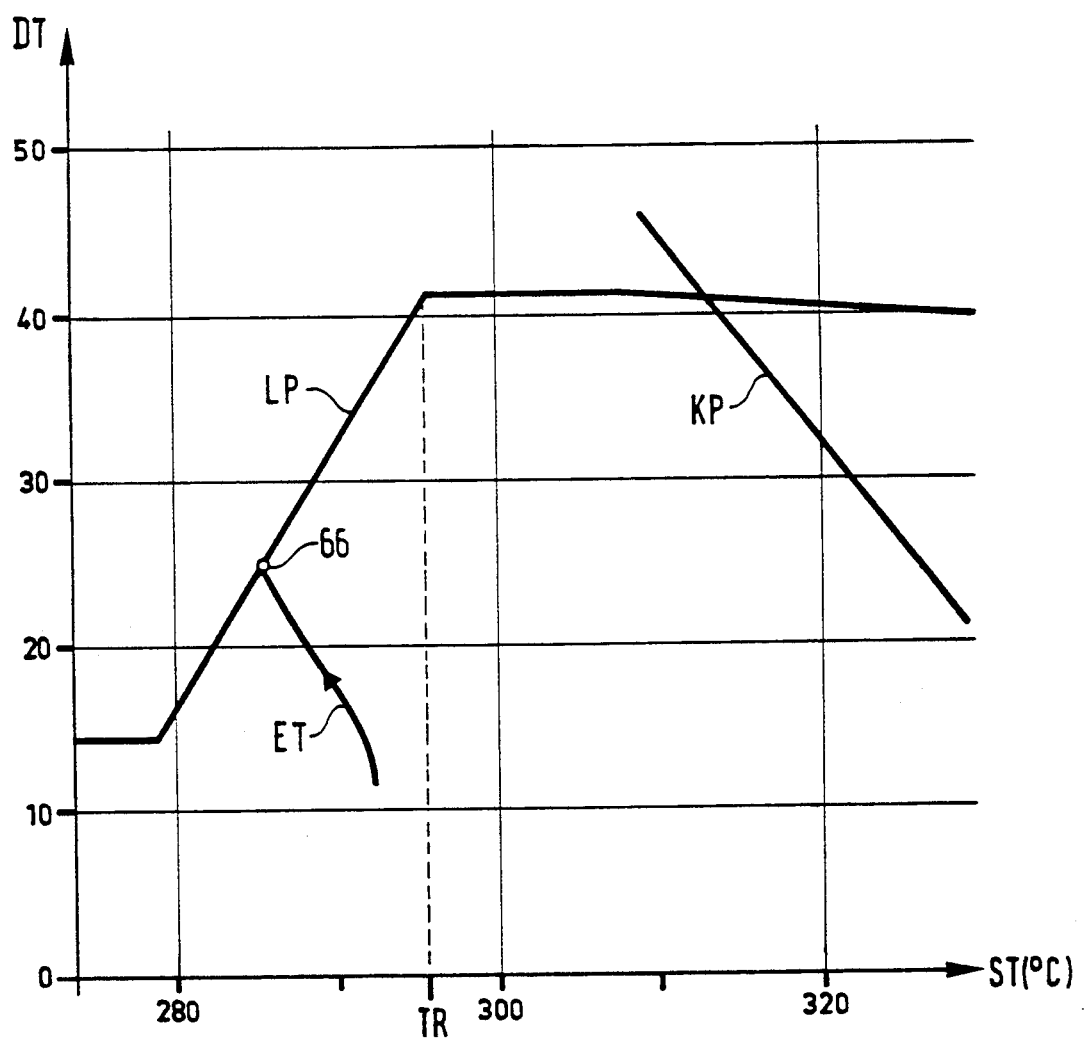
FIG. 5 is a graph analogous to FIG. 3, but showing the emergency stop limit LP which is obtained when using the system of FIG. 4.

In FIG. 5, curve ET shows the evolution of a transient due to uncontrolled increase of the load in the secondary heat exchange circuit. This transient is initially the same as that shown by the curve ET in FIG. 3. However, in this case it is interrupted at a point 66 which corresponds to the system of FIG. 4 delivering an emergency stop signal. It may be observed that this modification makes it possible to trigger an emergency reactor stop before reaching safety criteria. It therefore makes it possible to guarantee that these criteria are satisfied in the event of an excessive increase in the load.

In addition, it gives rise to more flexible dimensioning of the excess power system assembly, making it possible to use larger operating margins during certain transients in normal operation.

We claim:

1. In a method for protecting a nuclear reactor in the event of an increase in its load, said method comprising the steps of:

(a) monitoring an operating temperature of said reactor;

(b) setting an emergency stop limit for nuclear power of said reactor;

(c) monitoring said nuclear power;

(d) comparing said monitored nuclear power to said emergency stop limit; and (e) stopping said reactor when said monitored nuclear power exceeds said emergency stop limit;

the improvement wherein said method further comprises the steps of:

(f) setting a reference temperature for said operating temperature;

(g) comparing said monitored operating temperature to said reference temperature; and (h) lowering said emergency stop limit when said monitored operating temperature becomes less than said reference temperature.

2. In a method for protecting a nuclear reactor in the event of an increase in its load, said reactor comprising:

a core (2) containing fuel rods in which a nuclear reaction takes place, giving off nuclear power which is spread between a top and a bottom of the core and which is transformed into heat;

a heat exchange circuit (4, 6, 8) for causing a heat exchange fluid to penetrate into the core via an inlet duct (4), for causing it to flow through the core, and for causing it to leave the core via an outlet duct (6), thereby removing said heat, said circuit delivering the heat to a heat receiver (10) having varying needs; and control clusters (12) penetrating in controlled manner into said core in order to control said nuclear reaction; said method comprising the steps of:

(a) using at least one power measuring system (14) for delivering a total power signal (DT) representative of said nuclear power;

(b) using a temperature measuring system (18) for delivering an operating temperature signal (ST) representative of an operating temperature which is a temperature of said heat exchange fluid;

(c) using a power control system (24) for acting on some of said control clusters (12) in response to variations in the needs of said heat receiver (10) so that said heat receiver receives heat power that corresponds, at least approximately, to its needs;

(d) setting an emergency stop limit for said nuclear power; and (e) supplying at least said total power signal and said operating temperature signal to an excess power protection system, said excess protection system delivering an emergency stop signal causing at least some of said control clusters to penetrate into said core so as to stop said nuclear reaction when the nuclear power represented by said total power signal (ET) exceeds said emergency stop limit (LP);

the improvement wherein said method further comprises the steps of:

(f) setting a reference temperature for said operating temperature;

(g) including a function generator in said excess power protection system for partially controlling said emergency stop limit; and (h) supplying said reference temperature to said function generator, said function generator lowering said emergency stop limit when said operating temperature becomes less than said reference temperature.

3. A method according to claim 2, comprising the step of further using said function generator for further lowering said emergency stop limit when said operating temperature decreases from a value less than said reference temperature.

4. A method according to claim 2, comprising the step of further using said function generator for further lowering said emergency stop limit by a predetermined limit-lowering amount each time said operating temperature decreases by a predetermined value from a value less than said reference temperature.

5. A method according to claim 2, wherein said reference temperature (TR) lies in the range of 270° C. to 320° C.

6. A method according to claim 5, wherein said method is applied to a pressurized water reactor and said reference temperature (TR) lies in the range of 290° C. to 300° C.

7. A method according to claim 5, wherein said function generator gives to said emergency stop limit, when said operating temperature (ST) is 20° C. less than said reference temperature (TR), a value which is less than one-half the value that said function generator gives to it when said operating temperature is close to but greater than said reference temperature.

* * * * *